United States Patent
Paulraj et al.

(10) Patent No.: US 10,198,246 B2
(45) Date of Patent: Feb. 5, 2019

(54) METHODS AND APPARATUS FOR VOICE-ACTIVATED CONTROL OF AN INTERACTIVE DISPLAY

(71) Applicant: HONEYWELL INTERNATIONAL INC., Morris Plains, NJ (US)

(72) Inventors: Vasantha Selvi Paulraj, Karnataka (IN); Kiran Gopala Krishna, Karnataka (IN); Jitender Kumar Agarwal, UttarPradesh (IN); Sivaprakash Pasupathi, Tamilnadu (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 225 days.

(21) Appl. No.: 15/242,104

(22) Filed: Aug. 19, 2016

(65) Prior Publication Data
US 2018/0052657 A1    Feb. 22, 2018

(51) Int. Cl.
| | |
|---|---|
| *G06F 3/14* | (2006.01) |
| *G06F 3/16* | (2006.01) |
| *G06F 17/24* | (2006.01) |
| *G10L 15/22* | (2006.01) |
| *G06F 3/0482* | (2013.01) |
| *G06F 3/0484* | (2013.01) |

(52) U.S. Cl.
CPC ............ *G06F 3/167* (2013.01); *G06F 3/0482* (2013.01); *G06F 3/04842* (2013.01); *G06F 3/14* (2013.01); *G06F 17/243* (2013.01); *G10L 15/22* (2013.01); *G10L 2015/221* (2013.01)

(58) Field of Classification Search
CPC ................................. B64C 13/20; G06F 3/167
USPC .................................. 715/728, 771, 761–765
See application file for complete search history.

(56) References Cited

U.S. PATENT DOCUMENTS

| | | |
|---|---|---|
| 5,561,444 A | 10/1996 | Johnston, Jr. et al. |
| 5,781,179 A | 7/1998 | Nakajima et al. |
| (Continued) | | |

FOREIGN PATENT DOCUMENTS

WO    2014048308 A1    4/2014

OTHER PUBLICATIONS

Extended EP Search Report for Application No. 17184828.6 dated Feb. 19, 2018.

(Continued)

*Primary Examiner* — Cao H Nguyen
(74) *Attorney, Agent, or Firm* — Lorenz & Kopf, LLP

(57) ABSTRACT

A method for controlling an interactive display is provided. The method receives a set of voice input data, via a voice input device communicatively coupled to the interactive display; interprets, by at least one processor, the set of voice input data to produce an interpreted result, wherein the at least one processor is communicatively coupled to the voice input device and the interactive display; presents, by the interactive display, a text representation of the interpreted result coupled to a user-controlled cursor; receives, by a user interface, a user input selection of a textual or graphical element presented by the interactive display, wherein the user interface is communicatively coupled to the at least one processor and the interactive display; and performs, by the at least one processor, an operation associated with the interpreted result and the user input selection.

20 Claims, 8 Drawing Sheets

(56) References Cited

U.S. PATENT DOCUMENTS

| | | | |
|---|---|---|---|
| 6,081,818 | A | 6/2000 | Shieh |
| 6,281,883 | B1 | 8/2001 | Barker |
| 8,015,009 | B2 | 9/2011 | Harband et al. |
| 2002/0062213 | A1 | 5/2002 | Kosaka et al. |
| 2003/0093187 | A1* | 5/2003 | Walker .................... B64C 13/20 701/1 |
| 2006/0238511 | A1 | 10/2006 | Gyde et al. |
| 2009/0271191 | A1 | 10/2009 | Marquette et al. |
| 2011/0283204 | A1 | 11/2011 | Jacobs et al. |
| 2016/0077793 | A1* | 3/2016 | Disano .................... G06F 3/167 715/728 |

OTHER PUBLICATIONS

Xenom Apps; Speech to Text; https://play.google.com/store.
AndroidForAll; Speech to Text; https//play.google.com/store.
FSM Soft; Speech to Text Translator; https://play.google.com/store.
Morgan, J.; Copying and Moving Data With the Visible Clipboard; 2016.

* cited by examiner

METHODS AND APPARATUS FOR VOICE-ACTIVATED CONTROL OF AN INTERACTIVE DISPLAY

TECHNICAL FIELD

Embodiments of the subject matter described herein relate generally to control of interactive displays. More particularly, embodiments of the subject matter relate to voice-activated control of an interactive display.

BACKGROUND

Pilots and flight crew members of modern, highly-automated aircraft are tasked with maintaining awareness of many flight critical parameters and auto-flight modes. Pilot workload is often high, requiring the performance of multiple simultaneous tasks. For executing commands, making selections, or performing data entry tasks on an interactive display in a cockpit, a pilot or flight crew member may be required to direct his gaze downward toward a keyboard, thus taking his eyes off of other displays and instrumentation. Additionally, due to the high workload and potential distractions, a pilot or flight crew member may mistakenly enter data into an incorrect data field, enter an incompatible type of data (e.g., text, numbers) into a data field configured for a different type, inadvertently select an incorrect graphical element, or the like.

Accordingly, it is desirable to reduce the time required for a pilot to perform tasks associated with interactive display use onboard an aircraft and/or to increase accuracy of pilot task completion. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for controlling an interactive display. The method receives a set of voice input data, via a voice input device communicatively coupled to the interactive display; interprets, by at least one processor, the set of voice input data to produce an interpreted result, wherein the at least one processor is communicatively coupled to the voice input device and the interactive display; presents, by the interactive display, a text representation of the interpreted result coupled to a user-controlled cursor; receives, by a user interface, a user input selection of a textual or graphical element presented by the interactive display, wherein the user interface is communicatively coupled to the at least one processor and the interactive display; and performs, by the at least one processor, an operation associated with the interpreted result and the user input selection.

Some embodiments provide a system for user interaction with an interactive display. The system includes: a system memory element; a voice input device, configured to receive a set of voice input data; an interactive display, configured to present a plurality of graphical elements and a user-controlled cursor; a user interface, configured to receive a user input manipulation of the user-controlled cursor; and at least one processor, communicatively coupled to the system memory element, the voice input device, the interactive display, and the user interface, the at least one processor configured to: interpret the set of voice input data to produce an interpreted result; present, via the interactive display, a text representation of the interpreted result coupled to the user-controlled cursor; receive, via the user interface, a user input selection of one of the plurality of graphical elements; and perform an operation associated with the interpreted result and the user input selection.

Some embodiments provide a non-transitory, computer-readable medium containing instructions thereon, which, when executed by a processor, perform a method. The method performs, by the processor, an operation of an interactive display using a set of voice input data and a user-selected graphical element.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to apparatus and methods for voice control of operations of an interactive display. In certain embodiments, the interactive display is a cockpit display device onboard an aircraft. However, other embodiments of the interactive display may include any type of display with voice input and speech recognition capabilities. Operations of the interactive display may include, without limitation, data entry operations, graphical element manipulation operations, and performing user selections of presented graphical lists.

Figure 1:
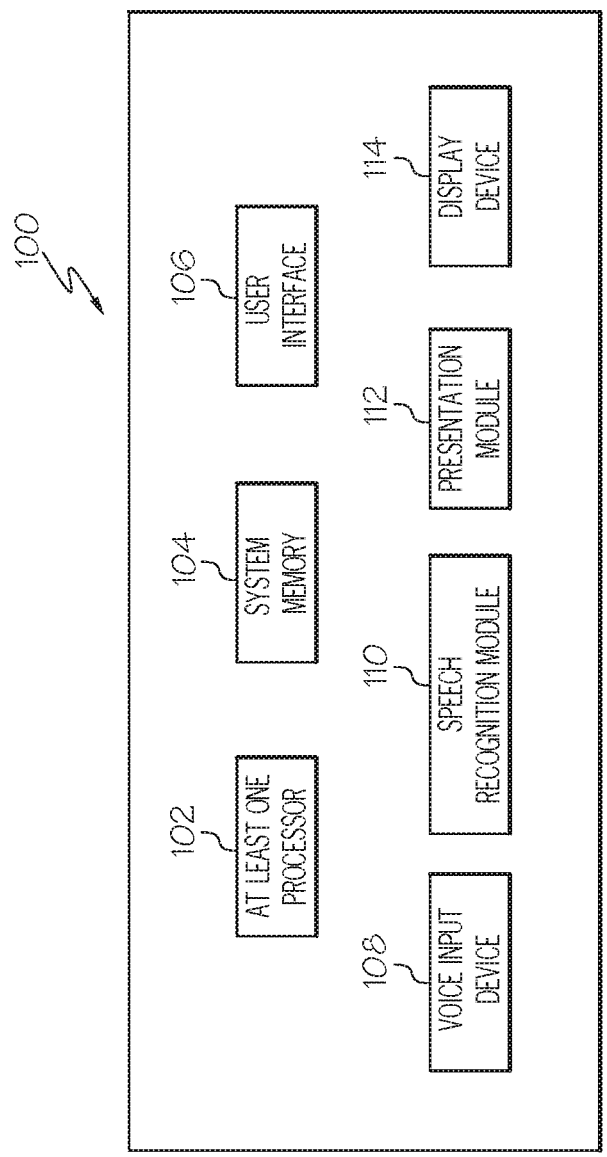
FIG. 1 is a functional block diagram of an interactive display control system, in accordance with the disclosed embodiments.

Turning now to the figures, FIG. 1 is a functional block diagram of an interactive display control system 100, in accordance with the disclosed embodiments. The interactive display control system 100 may be implemented using any type of computer system communicatively coupled to a display device. Exemplary embodiments of the interactive display control system 100 may be deployed on an aircraft, train, automobile, or other type of environment where an operator may use voice control to perform one or more operations of the display device.

The interactive display control system 100 generally includes, without limitation, at least one processor 102; a system memory 104 element; a user interface 106; a voice input device 108; a speech recognition module 110; a presentation module 112; and a display device 114. These elements and features of the interactive display control system 100 may be operatively associated with one another, coupled to one another, or otherwise configured to cooperate with one another as needed to support the desired functionality—in particular, performing voice-controlled operations associated with the interactive display control system 100, as described herein. For ease of illustration and clarity, the various physical, electrical, and logical couplings and interconnections for these elements and features are not depicted in FIG. 1. Moreover, it should be appreciated that embodiments of the interactive display control system 100 will include other elements, modules, and features that cooperate to support the desired functionality. For simplicity, FIG. 1 only depicts certain elements that relate to the voice-control techniques described in more detail below.

The at least one processor 102 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 102 may be realized as one or more microprocessors, controllers, microcontrollers, or state machines. Moreover, the at least one processor 102 may be implemented as a combination of computing devices, e.g., a combination of digital signal processors and microprocessors, a plurality of microprocessors, one or more microprocessors in conjunction with a digital signal processor core, or any other such configuration.

The at least one processor 102 communicates with system memory 104. The system memory 104 may be used to store operations associated with the interactive display control system 100, speech recognition algorithms, data types associated with particular data fields and/or interpreted speech data or voice data, or the like. The system memory 104 may be realized using any number of devices, components, or modules, as appropriate to the embodiment. In practice, the system memory 104 could be realized as RAM memory, flash memory, EPROM memory, EEPROM memory, registers, a hard disk, a removable disk, or any other form of storage medium known in the art. In certain embodiments, the system memory 104 includes a hard disk, which may also be used to support functions of the at least one processor 102. The system memory 104 can be coupled to the at least one processor 102 such that the at least one processor 102 can read information from, and write information to, the system memory 104. In the alternative, the system memory 104 may be integral to the at least one processor 102. As an example, the at least one processor 102 and the system memory 104 may reside in a suitably designed application-specific integrated circuit (ASIC).

The user interface 106 may include or cooperate with various features to allow a user to interact with the interactive display control system 100. Accordingly, the user interface 106 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the interactive display control system 100. For example, the user interface 106 could be manipulated by an operator to position a user-controlled cursor of the display device 114, or to select one or more graphical elements presented by the display device 114.

In certain embodiments, the user interface 106 may include or cooperate with various features to allow a user to interact with the interactive display control system 100 via graphical elements rendered on a display device 114. Accordingly, the user interface 106 may initiate the creation, maintenance, and presentation of a graphical user interface (GUI). In certain embodiments, the display device 114 implements touch-sensitive technology for purposes of interacting with the GUI. Thus, a user can manipulate the GUI by moving a cursor symbol rendered on the display device 114, or by otherwise physically interacting with the display device 114 for recognition and interpretation, via the user interface 106.

The voice input device 108 may include any means of transmitting voice input data into the interactive display control system 100, to include without limitation: a microphone, a push-to-talk or push-to-transmit (PTT) device, a push-to-talk over cellular (PoC) device, or other input device capable of receiving audio data. Voice data may also be referred to as speech data. Voice input data may include any sounds articulated by a user and received by the voice input device 108, and voice input data is defined by a beginning point and an endpoint. In certain embodiments, the voice input device 108 may be implemented as a microphone that receives voice input data continuously, wherein the beginning point and the endpoint are defined by a user input indication (e.g., an articulated codeword, a button-push). In some embodiments, the voice input device 108 may be implemented as a push-to-talk (PTT) device, wherein the beginning point is defined by an activating push-button indication, and wherein the endpoint is defined by a deactivating release of the push-button.

The speech recognition module 110 is configured to receive voice data (i.e., speech data) from the voice input device 108, and to apply speech recognition algorithms to interpret the received voice data. The speech recognition module 110 may utilize commonly known and used speech recognition techniques to determine words or phrases uttered by a user (e.g., a flight crew member) and received at the voice input device 108.

The presentation module 112 is configured to operate cooperatively with the display device 114 to present graphical elements associated with operations of the display device 114. Generally, the operations of the display device 114 are associated with an underlying application of the display device 114 itself. For example, when the display device 114 is implemented onboard an aircraft, then the presentation module 112 is configured to display particular data associated with operation of the aircraft. As another example, when the display device 114 is implemented onboard an automobile, then the presentation module 112 is configured to present particular data associated with operation of the automobile. In a third example, when the display device 114 is implemented as part of a computer system or personal computing device, then the presentation module 112 is configured to present particular data associated with an application of the computer system or personal computing device. In certain embodiments, the presentation module 112 operates cooperatively with the speech recognition module 110 to present a text representation of an interpreted result of a set of input voice data. Generally, the presentation module 112 presents the text representation coupled to a user-controlled cursor, such that the text representation may be moved around the display device 114, via the user interface 106, and positioned appropriately for an operation to be performed.

In practice, the speech recognition module 110 and/or the presentation module 112 may be implemented with (or cooperate with) the at least one processor 102 to perform at least some of the functions and operations described in more detail herein. In this regard, the speech recognition module 110 and/or the presentation module 112 may be realized as suitably written processing logic, application program code, or the like.

The display device 114 is any type of standard display configured to operate cooperatively with the presentation module 112 to display various icons, text, and/or graphical elements associated with performing operations for an underlying application of the display device 114 itself. For example, when the display device 114 is implemented onboard an aircraft, the graphical elements may be specific to aircraft applications.

In an exemplary embodiment, the display device 114 is communicatively coupled to the user interface 106 and the at least one processor 102. The at least one processor 102, the user interface 106, and the presentation module 112 are cooperatively configured to display, render, or otherwise convey one or more graphical representations or images associated with an underlying application on the display device 114, as described in greater detail below. In some embodiments, the display device 114 is an integrated display that is built into the interactive display control system 100. However, in other embodiments, the display device 114 may be realized as a separate display element that is communicatively coupled to the interactive display control system 100. Certain embodiments of the display device 114 may include more than one display element, such that providing voice controlled operations for the interactive display control system 100 may be accomplished via more than one display.

Figure 2:
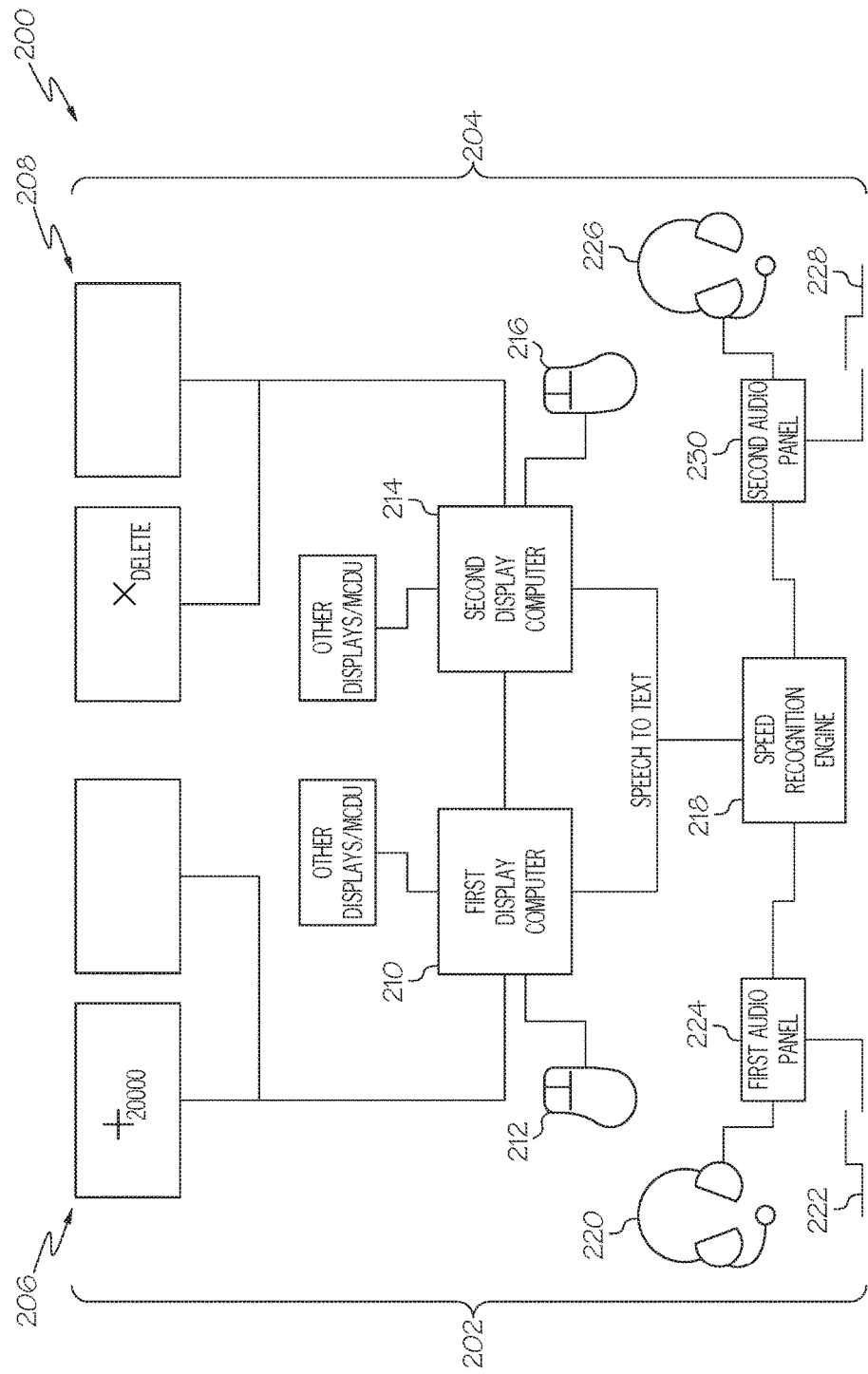
FIG. 2 is a diagram of a dual work-center system onboard an aircraft, in accordance with the disclosed embodiments.

FIG. 2 is a diagram of a dual work-center system 200 onboard an aircraft, configured for voice control, in accordance with the disclosed embodiments. It should be noted that the dual work-center system 200 is one exemplary embodiment of the interactive display control system 100 depicted in FIG. 1. In this regard, the dual work-center system 200 shows certain elements and components of the interactive display control system 100 in more detail. Although the dual work-center system 200 represents an exemplary embodiment configured for two users, other embodiments of the dual work-center system 200 may include more than two screens or work centers that implement the functionality described herein.

The dual work-center system 200 includes two distinct workstations 202, 204 implemented onboard an aircraft. In this exemplary embodiment, the first workstation 202 is configured for use by the captain of the aircraft, and includes a set of captain's displays 206 in communication with a first display computer 210 and a first cursor control device 212. The second workstation 204 is configured for use by the first officer of the aircraft, and includes a set of first officer displays 208 in communication with a second display computer 214 and a second cursor control device 216.

The first display computer 210 and the second display computer 214 are communicatively coupled to a speech recognition engine 218, which functions to interpret voice input data received from each of the workstations 202, 204. The first workstation 202 is configured to receive voice input data via a first voice input device 220 that includes a first push-to-talk (PTT) switch 222. When a user pushes the first PTT switch 222 and speaks into the first voice input device 220, then the voice input data is received at the first audio panel 224. In the embodiment shown, the set of received voice input data is bounded by PTT or push-button indications. Here, the user pressing the first PTT switch 222 prior to speaking into the first voice input device 220 is a PTT indication of the beginning of the set of voice data, and the user releasing the first PTT switch 222 is an indication that the set of voice data is complete. The beginning point of the set of voice data is defined by an activating push-button indication, and the endpoint is defined by a deactivating release of the push-button. In certain embodiments, the first voice input device 220 may be implemented without a PTT switch 222. In the absence of a PTT Switch 222, the dual work-center system 200 may be voice-triggered or voice-activated to mark the beginning and end of the voice data set.

The first audio panel 224 transmits the voice input data to the speech recognition engine 218. Similarly, the second workstation 204 is configured to receive voice input data via a second voice input device 226 that includes a second push-to-talk (PTT) switch 228. When a user pushes the second PTT switch 228 and speaks into the second voice input device 226, then the voice input data is received at the second audio panel 230 which transmits the voice input data to the speech recognition engine 218.

Using voice input data from the first audio panel 224 and/or the second audio panel 230, the speech recognition engine 218 uses well-known and commonly used speech recognition algorithms and techniques to interpret the received voice input data. The speech recognition engine 218 produces a text representation of the interpreted voice input data, and provides the text representation to the first display computer 210 and/or the second display computer 214. In some embodiments, the dual work-center system 200 may include one or more Speech Recognition Engines 218.

First Embodiment: Standard Voice Control Operation

In some embodiments, the dual work-center system 200 functions according to standard voice control techniques, as described herein. As a first example of operation, the first workstation 202 receives audio data from a first user via the first voice input device 220. When the first user presses the first PTT switch 222 and speaks into the first voice input device 220, voice input data is received at the first audio panel 224. The first audio panel 224 then uses the speech recognition engine 218 to interpret the voice input data and converts the interpreted result into a text representation. For purposes of this example, the text representation is the integer value "20000". The first display computer 210 is configured to present a cursor for the user to control and manipulate various textual and/or graphical elements presented by the captain's displays 206. Once the voice input data has been interpreted and converted into the text representation "20000", the first display computer 210 "tags" the cursor with the text representation, or in other words, couples the text representation to the cursor to create a combination element. The combination element includes the cursor and the text representation, presented together to provide visual feedback to the first user that indicates the substance or content of the voice input data provided by the first user. The combination element is configured for manipulation by the first user, via the first cursor control device 212. Here, the user may make selections of various text data entry fields or graphical elements, using the combination element, for purposes of performing data entry using the user-entered "20000", and/or performing list item selection using the user-entered "20000".

As a second example of operation, the second workstation 204 receives audio data from a second user via the second voice input device 226. When the second user presses the second PTT switch 228 and speaks into the second voice input device 226, voice input data is received at the second audio panel 230. The second audio panel 230 then uses the speech recognition engine 218 to interpret the voice input data and converts the interpreted result into a text representation. For purposes of this example, the text representation is the executable command "DELETE". The second display computer 214 is configured to present a cursor for the user to control and manipulate various text and/or graphical elements presented by the first officer's displays 208. Once the voice input data has been interpreted and converted into the text representation "DELETE", the second display computer 214 "tags" the cursor with the text representation to create a combination element. The combination element includes the cursor and the text representation "DELETE", presented together to provide visual feedback to the first user that indicates the substance or content of the voice input data provided by the second user. The combination element is configured for manipulation by the second user, via the second cursor control device 216. Here, the user may make selections of various text data entry field or graphical elements, using the combination element, for purposes of executing a predefined "delete" command, which is identified using the user-entered "DELETE".

Second Example: Off-Side Voice Control Operation

In some embodiments, the dual work-center system 200 functions using off-side voice control techniques, as described herein. As a first example of operation, the second workstation 204 receives a first set of audio data, which includes an "off-side" command, from a second user via the second voice input device 226. When the second user presses the second PTT switch 228 and speaks into the second voice input device 226, the off-side command is received at the second audio panel 230. The second audio panel 230 then uses the speech recognition engine 218 to interpret the voice input data, and the second display computer 214 activates the first display computer 210 for voice control operation. Here, the off-side command entered by the second user at the second workstation is used so that the second user may voice-control the cursor of the first display computer 210 and captain's displays 206

After receiving, interpreting, and using the off-side command, the second workstation 204 receives audio data from the second user via the second voice input device 226. When the second user presses the second PTT switch 228 and speaks into the second voice input device 226 (for the second time), a second set of voice input data is received at the second audio panel 230. The second audio panel 230 then uses the speech recognition engine 218 to interpret the second set of voice input data and converts the interpreted result into a text representation. For purposes of this example, the text representation is the integer value "20000". Due to the previously entered off-side command, the text representation is transmitted to the first display computer 210, instead of the second display computer 214. The first display computer 210 is configured to present a cursor for the user to control and manipulate various graphical elements presented by the captain's displays 206. Once the voice input data has been interpreted and converted into the text representation "20000", the first display computer 210 "tags" the cursor with the text representation to create a combination element. The combination element includes the cursor and the text representation, presented together to provide visual feedback to the first user that indicates the substance or content of the voice input data provided by the second user. The combination element is configured for manipulation by the first user, via the first cursor control device 212. The first user may make selections of various text data entry field or graphical elements, using the combination element, for purposes of performing data entry using the user-entered "20000", and/or performing list item selection using the user-entered "20000". Here, the second user is permitted to submit voice-control data or commands via the off-side functionality, but the positioning of the combination element and making selections using the combination element are performed by the first user via the first cursor control device 212.

Figure 3:
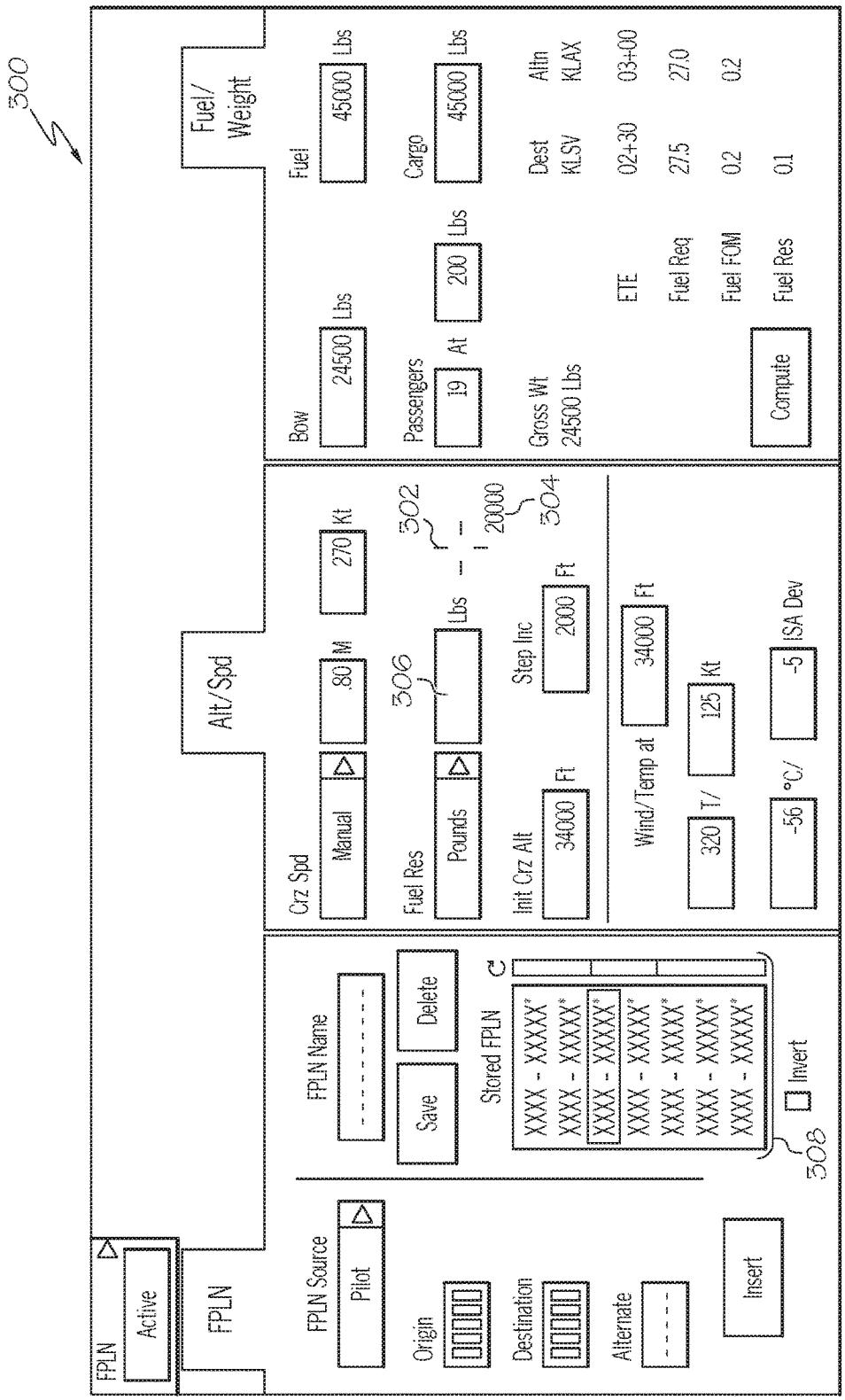
FIG. 3 is a diagram of an interactive display associated with a data entry application, in accordance with the disclosed embodiments.

FIG. 3 is a diagram of an interactive display 300 associated with a data entry application, in accordance with the disclosed embodiments. In this example, a data entry application like a Flight Management Window (FMW) is considered. As shown, the interactive display 300 may be identified as a Flight Management Window (FMW) page. The interactive display 300 is configured for flight crew member use for flight planning and manipulation applications and functionality. The interactive display 300 provides a graphical user interface (GUI) and a cursor 302 for user interaction with the GUI. The cursor 302 may be used to press buttons, select a presented list, scroll a presented list and make list-item selections, select a data field 306 for data entry, or the like.

The interactive display 300 is communicatively coupled to a voice input device and an aircraft onboard computer system configured to perform speech recognition, described previously with regard to FIG. 1. The interactive display 300 is configured for voice control, as described herein. When a user provides voice input data, the voice input data is interpreted, and the interactive display 300 creates a text representation 304 of the interpreted result. As shown, the cursor 302 is coupled to the text representation 304, and this combination of the cursor 302 and the text representation 304 may be referred to as a "combination element". The combination element is operates similar to the cursor 302, and also provides visual feedback to the user regarding the interpreted result of the voice input data.

Figure 4:
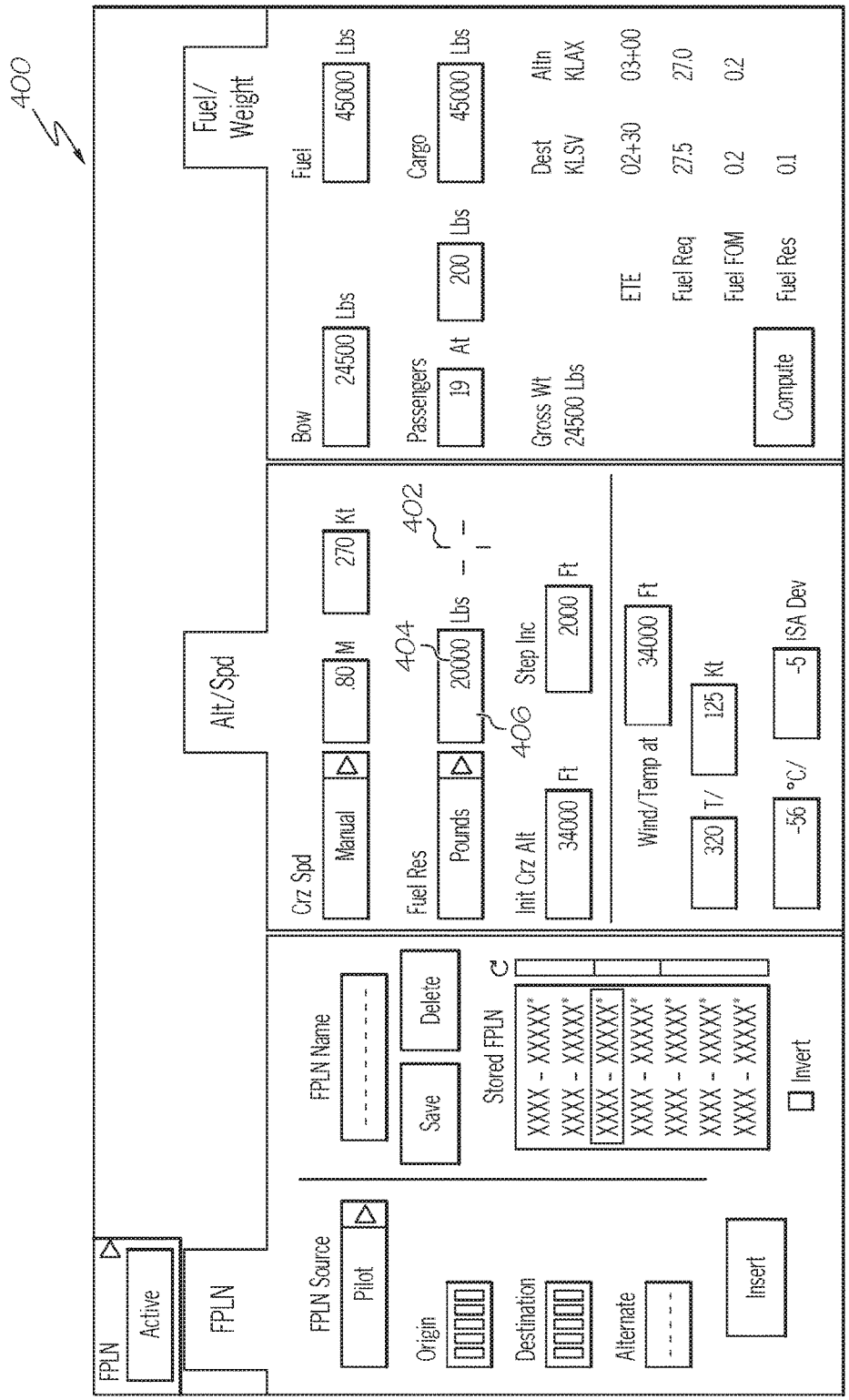
FIG. 4 is another diagram of an interactive display associated with a data entry application, in accordance with the disclosed embodiments.

In some embodiments, the user may move the combination element to a list 308, click to select the list 308, and the interactive display 300 then automatically selects an item in the list that corresponds to the text representation 304. In some embodiments, the user may move the combination element to a data field 306, click to select the data field 306, and the interactive display 300 then automatically pastes the text representation 304 into the data field 306. This embodiment is shown in FIG. 4, which is another diagram of an interactive display 400 associated with a data entry application, in accordance with the disclosed embodiments. The interactive display 400 of FIG. 4 presents a similar GUI to that described above with regard to FIG. 3. The interactive display 400 is shown after a user has selected the data field 406 with the combination element (described with regard to FIG. 3). Here, the cursor 402 is no longer coupled to the text representation 404, which has been pasted into the data field 406.

Figure 5:
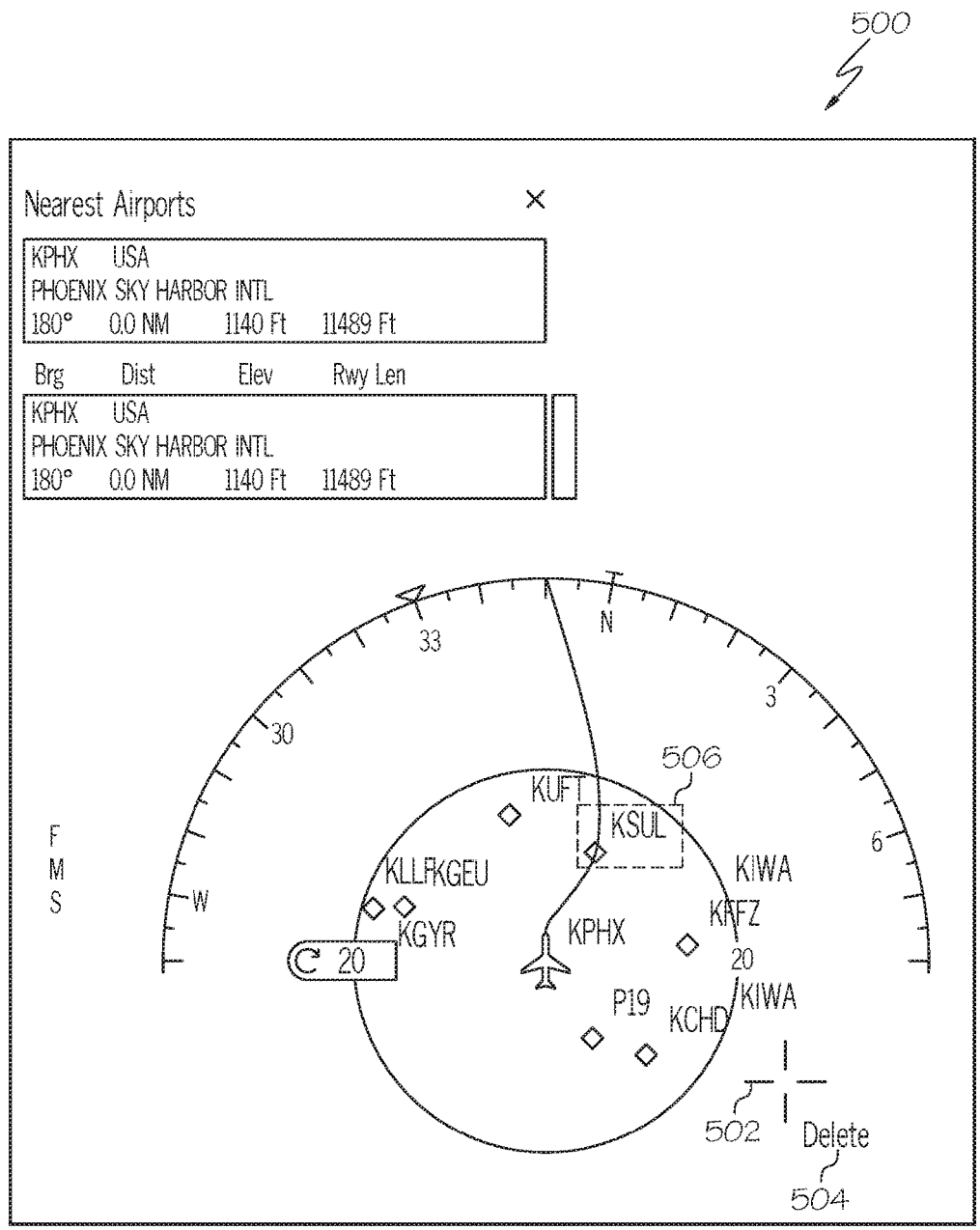
FIG. 5 is a diagram of an interactive display associated with a voice manipulation of graphical elements, in accordance with the disclosed embodiments.

FIG. 5 is a diagram of an interactive display 500 associated with a voice manipulation of graphical elements, in accordance with the disclosed embodiments. As shown in this example, the interactive display 500 may be identified as a navigation page or map page. The interactive display 500 is configured for flight crew member use for aircraft position, status and navigation applications and functionality. The interactive display 500 provides a graphical user interface (GUI) and a cursor 502 for user interaction with the GUI. As applied to this particular GUI, the cursor 502 may be used to make selections of one or more particular waypoints for manipulation by performing a voice input command.

Like FIGS. 3-4, the interactive display 500 is communicatively coupled to a voice input device and an aircraft onboard computer system configured to perform speech recognition, described previously with regard to FIG. 1. The interactive display 500 is configured for voice control, as described herein. When a user provides voice input data, the voice input data is interpreted, and the interactive display 500 creates a text representation 504 of the interpreted result. As shown, the cursor 502 is coupled to the text representation 504, and this combination of the cursor 502 and the text representation 504 may be referred to as a "combination element". The combination element is operates similar to the cursor 502, and also provides visual feedback to the user regarding the interpreted result of the voice input data.

Figure 6:
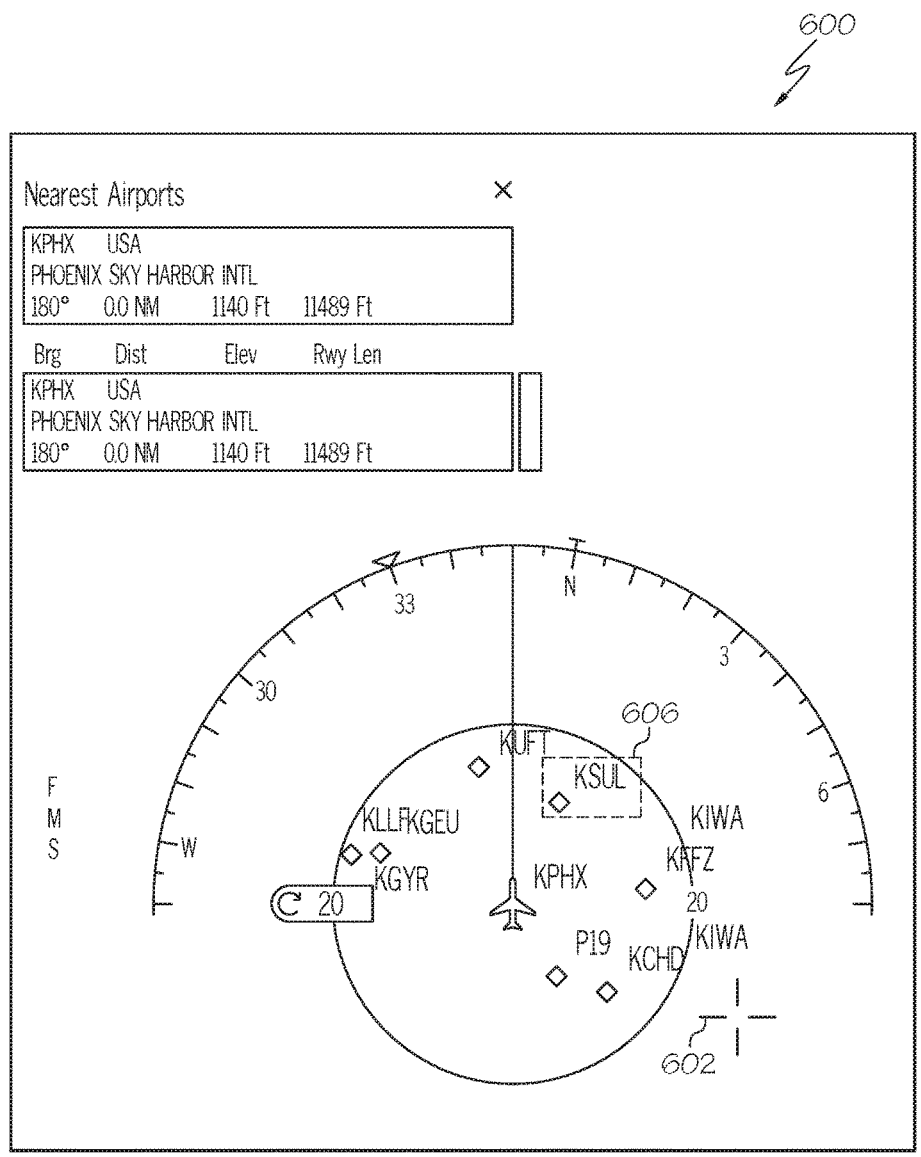
FIG. 6 is another diagram of an interactive display associated with a voice manipulation of graphical elements, in accordance with the disclosed embodiments.

In some embodiments, the user may move the combination element to select a waypoint 506, click to select the waypoint 506, and the interactive display 500 then automatically performs the operation that corresponds to the text representation 504, using the selected waypoint 506. In this example, the text representation 504 includes the command "delete". When the combination element selects the waypoint 506, then the interactive display 500 executes the command by deleting the waypoint 506. The result of this example is presented by FIG. 6, which is another diagram of an interactive display 600 associated with a voice manipulation of graphical elements, in accordance with the disclosed embodiments. Here, the interactive display 600 is shown after a user has selected the waypoint (reference 506 of FIG. 5) with the combination element. Here, the cursor 602 is no longer coupled to the text representation of the command, which has been executed. This has resulted in an empty space 606, at the location of the deleted waypoint.

Figure 7:
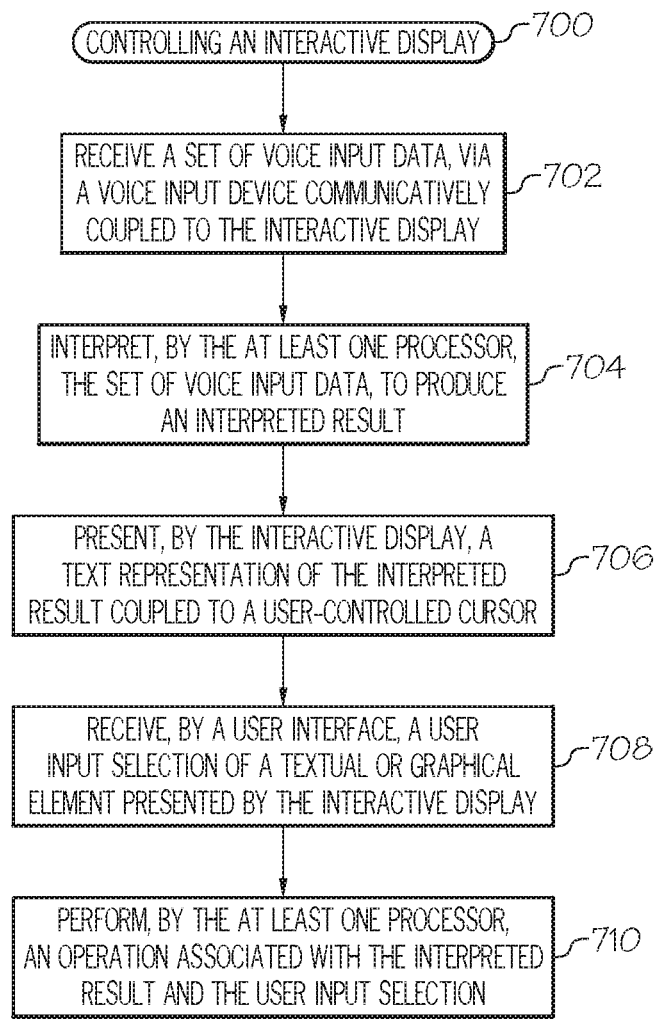
FIG. 7 is a flow chart that illustrates an embodiment of a process for controlling an interactive display.

FIG. 7 is a flow chart that illustrates an embodiment of a process 700 for controlling an interactive display. First, the process 700 receives a set of voice input data, via a voice input device communicatively coupled to the interactive display (step 702). Next, the process 700 interprets, by the at least one processor, the set of voice input data, to produce an interpreted result (step 704), wherein the at least one processor is communicatively coupled to the voice input device and the interactive display. Here, the process 700 uses speech recognition algorithms to determine words or phrases uttered by a user (e.g., a flight crew member) and received by the process 700.

The process 700 then presents, by the interactive display, a text representation of the interpreted result coupled to a user-controlled cursor (step 706). The text representation provides visual feedback to the user, from which the user may verify that the process 700 has interpreted the voice input data correctly. The user-controlled cursor operates similarly to a traditional cursor on a screen or display, allowing the user to move the cursor for purposes of selecting one or more features, operations, or graphical elements presented on the display. Here, the process 700 presents the text representation and the cursor as a combination element, wherein the text representation is coupled to the user-controlled cursor, and the combination element is user-controllable. The combination element may be positioned by a user to select a data field for pasting the text representation, to select a graphical list for automatic selection of the text representation from the graphical list, or to select one of a plurality of displayed features for deletion or repositioning.

Next, the process 700 receives, by a user interface, a user input selection of a graphical element presented by the interactive display (step 708), wherein the user interface is communicatively coupled to the at least one processor and the interactive display. The user-input selection is obtained by the process 700 when the user-controlled combination element is positioned by a user and the combination element is used to make a selection (e.g., a user may position the combination element and click a mouse, tap a touchpad, or otherwise select the location of the position of the combination element). Generally, the selected graphical element includes one of the previously described examples: (1) a data field for pasting the text representation; (2) a graphical list for automatic selection of the text representation from the graphical list; or (3) one of a plurality of displayed features for deletion or repositioning.

The process 700 then performs, by the at least one processor, an operation associated with the interpreted result and the user input selection (step 710). In scenarios where the selected graphical element is a data field, the process 700 performs the operation by positioning the text representation coupled to the user-controlled cursor (i.e., the combination element) in the data field and pastes the text representation in the data field, based on the positioning. In some embodiments, the process 700 first identifies a data type associated with the text representation, and pastes the text representation in the selected data field when the data type associated with the data field is compatible with the data type of the text representation. For example, if the text representation is an integer value, and the selected data field is compatible with an integer value, then the process 700 pastes the text representation when the data field is selected by the user. However, if the text representation is an integer value, but the data field is configured to receive an alphabetical string of characters, then the process 700 will not paste the text representation when the data field is selected. In this example, the combination element retains the text representation for pasting, upon user selection of another data field compatible with the data type of the text representation.

In scenarios where the selected graphical element is a graphical list that includes a plurality of list items, the process 700 performs the operation by performing an automatic selection of one of the list items, based on the interpreted result, and presents the one of the list items. This example of a graphical list is described previously with regard to FIG. 3, reference 308.

In scenarios where the selected graphical element is a one of a plurality of displayed features, the process 700 performs the operation by identifying a command, based on the interpreted result. The process 700 then executes the command, thereby altering the one of the plurality of displayed features, to create an altered plurality of displayed features, and presents the altered plurality of displayed features, by the interactive display. The command may include any operation applicable to manipulate presented features or graphical elements presented by the display. Commands may include, without limitation: deleting a presented graphical element, replacing a presented graphical element, defining a graphical element, centering a presented display interface, performing a zoom function, connecting a plurality of graphical elements, opening or closing a dialog box, or the like. In exemplary embodiments, wherein the process 700 is implemented onboard an aircraft (as described previously with regard to FIGS. 2-6), the command may include, without limitation: deleting a waypoint, replacing a waypoint, defining a waypoint, centering a presented map, applying A424 standards (e.g., holding to a waypoint, procedure turn), zoom functions, connecting two or more waypoints, opening and closing a dialog box, or the like.

Figure 8:
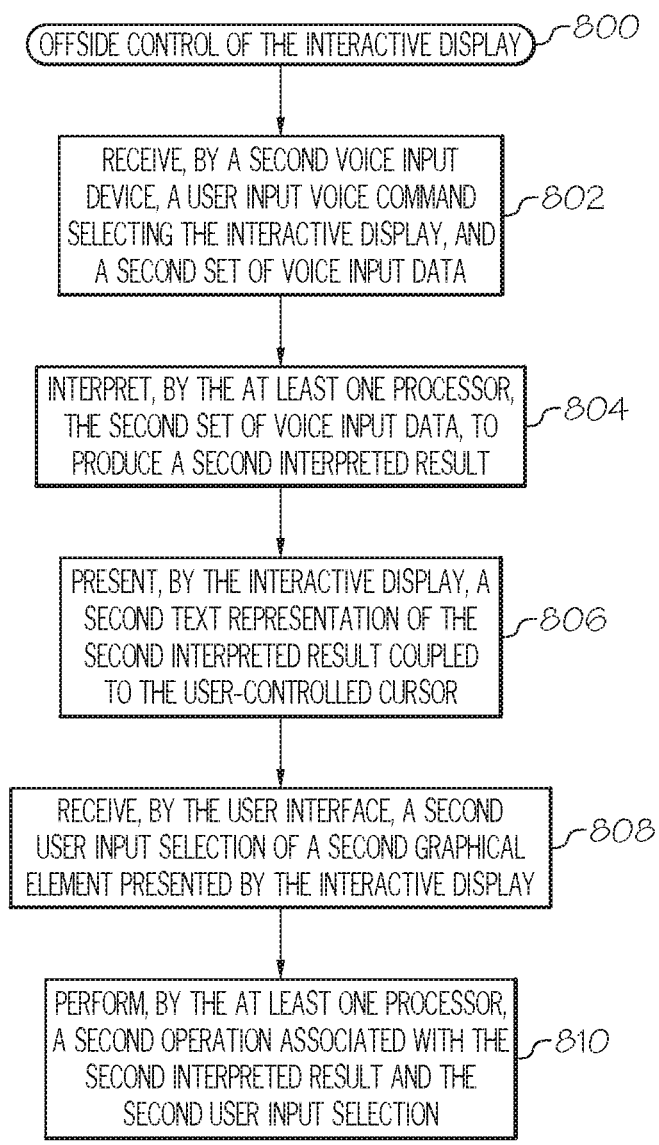
FIG. 8 is a flow chart that illustrates an embodiment of a process for off-side control of an interactive display.

FIG. 8 is a flow chart that illustrates an embodiment of a process 800 for off-side control of an interactive display. The process 800 is generally implemented for interactive display control for a dual (or multiple) work-center system onboard an aircraft, automobile, or in a control station, as depicted in FIG. 2. First, the process 800 receives, by a second voice input device, a user input voice command selecting the interactive display, and a second set of voice input data (step 802). The second set of voice input data corresponds to the set of voice input data described with regard to FIG. 7, step 702. The second set of voice input data may include a command for execution to manipulate textual data entry fields or graphical elements presented by the interactive display, a list item for selection from a presented graphical list, or a data entry for pasting in a presented graphical data field.

The user input voice command is received by the process 800 and used to select a particular interactive display of a set of two or more interactive displays. This embodiment is described in detail with regard to FIG. 2. In some embodiments, the user input voice command may include a single word that indicates to the process 800 that the user providing the voice input data is seeking to enter data and/or manipulate graphical elements at an off-side display, wherein an off-side display comprises a display that is not the primary display associated with the second voice input device.

Next, the process 800 interprets, by the at least one processor, the second set of voice input data, to produce a second interpreted result (step 804). Here, the process 800 uses speech recognition algorithms to determine words or phrases uttered by a user (e.g., a flight crew member) and received by the second voice input device.

The process 800 then presents, by the interactive display, a second text representation of the second interpreted result coupled to the user-controlled cursor (step 806). The second text representation is a visual representation of the recognized and interpreted voice input data, and is coupled to the user-controlled cursor to create a combination element. Next, the process 800 receives, by the user interface, a second user input selection of a second graphical element presented by the interactive display (step 808).

Although the second voice input and the user input voice command are received via the second voice input device (step 802) by a first user that is off-side from the interactive display, the second user input selection is performed by a second user positioned at the interactive display. The second user provides the second user input selection by controlling the combination element on the interactive display to select a second graphical element. The second graphical element may be a data field, a waypoint, a graphical list, or the like, as described previously.

The process 800 then performs, by the at least one processor, a second operation associated with the second interpreted result and the second user input selection (step 810). Here, the process 800 has received an off-side command from the first user to voice-control the interactive display positioned at the workstation of the second user. The process 800 then receives a set of substantive voice input data from the first user, wherein the substantive voice input data may be a command to manipulate graphical elements of the interactive display or an interpreted data result for data entry (e.g., pasting into a data field). The process 800 performs the operation by executing the command or pasting the data result.

The various tasks performed in connection with processes 700-800 may be performed by software, hardware, firmware, or any combination thereof. For illustrative purposes, the preceding description of processes 700-800 may refer to elements mentioned above in connection with FIGS. 1-6. In practice, portions of processes 700-800 may be performed by different elements of the described system. It should be appreciated that processes 700-800 may include any number of additional or alternative tasks, the tasks shown in FIGS. 7-8 need not be performed in the illustrated order, and processes 700-800 may be incorporated into a more comprehensive procedure or process having additional functionality not described in detail herein. Moreover, one or more of the tasks shown in FIGS. 7-8 could be omitted from embodiments of the processes 700-800 as long as the intended overall functionality of each of the processes 700-800 remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks.

The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element, node, or feature is directly or indirectly joined to (or directly or indirectly communicates with) another element, node, or feature, and not necessarily mechanically. Likewise, unless expressly stated otherwise, "connected" means that one element, node, or feature is directly joined to (or directly communicates with) another element, node, or feature, and not necessarily mechanically. Thus, although the schematics shown in FIGS. 1-2 depict one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for controlling an interactive display, the method comprising:
   receiving a set of voice input data, via a voice input device communicatively coupled to the interactive display;
   interpreting, by at least one processor, the set of voice input data to produce an interpreted result, wherein the at least one processor is communicatively coupled to the voice input device and the interactive display;
   presenting, by the interactive display, a combination element comprising a text representation of the interpreted result coupled to a user-controlled cursor, wherein presentation of the combination element provides visual feedback indicating content of the interpreted result, and wherein the combination element is configured for user manipulation including positioning the combination element and making selections using the combination element;
   receiving, by a user interface, a user input selection of a textual or graphical element presented by the interactive display, wherein the user input selection is performed via the user manipulation of the combination element over the textual or graphical element and performance of a click to select the textual or graphical element, and wherein the user interface is communicatively coupled to the at least one processor and the interactive display;
   performing, by the at least one processor, an operation associated with the interpreted result and the user input selection, wherein the interpreted result comprises a command, and wherein the command comprises the operation applicable to manipulate the textual or graphical element presented by the interactive display; and
   after performing the operation associated with the interpreted result, presenting the user-controlled cursor without the text representation of the interpreted result, to indicate performance of the operation associated with the interpreted result.

2. The method of claim 1, wherein receiving the user input selection further comprises receiving a user input selection of a data field; and
   wherein performing the operation associated with the interpreted result and the user input selection further comprises:
      positioning the text representation coupled to the user-controlled cursor in the data field; and pasting the text representation in the data field, based on the positioning.

3. The method of claim 1, wherein receiving the user input selection further comprises receiving a user input selection of a data field; and
wherein performing the operation associated with the interpreted result and the user input selection further comprises:
identifying a data type associated with the text representation;
positioning the text representation coupled to the user-controlled cursor in the data field; and
when the data type associated with the text representation corresponds to a type associated with the data field, pasting the text representation in the data field, based on the positioning.

4. The method of claim 1, wherein receiving the user input selection further comprises receiving a user input selection of a graphical list comprising a plurality of list items; and
wherein performing the operation associated with the interpreted result and the user input selection further comprises:
performing an automatic selection of one of the list items, based on the interpreted result; and
presenting the one of the list items.

5. The method of claim 1, wherein receiving the user input selection further comprises receiving a user input selection of one of a plurality of displayed features;
wherein the method further comprises identifying a command, based on the interpreted result; and
wherein performing the operation associated with the interpreted result and the user input selection further comprises:
executing the command, by the at least one processor;
altering the one of the plurality of displayed features, based on executing the command, to create an altered plurality of displayed features; and
presenting the altered plurality of displayed features, by the interactive display.

6. The method of claim 1, wherein the voice input device comprises a push-to-talk (PTT) voice input device communicatively coupled to the interactive display, the PTT voice input device comprising a work-center selection switch; and
wherein the method further comprises:
receiving, via the work-center selection switch, a user input selection of a second work-center; and
routing the interpreted result to a second interactive display associated with the second work-center, wherein the interactive display is associated with a first work-center;
wherein the text representation is presented by the second interactive display; and
wherein the user input selection of the textual or graphical element is presented by the second interactive display.

7. The method of claim 1, further comprising:
wherein the voice input device comprises a voice-activated microphone communicatively coupled to the interactive display; and
wherein the method further comprises:
receiving, via the voice-activated microphone, a user input selection of a second work-center; and
routing the interpreted result to a second interactive display associated with the second work-center, wherein the interactive display is associated with a first work-center;
wherein the text representation is presented by the second interactive display; and
wherein the user input selection of the textual or graphical element is presented by the second interactive display.

8. The method of claim 1, further comprising:
receiving, by a second voice input device, a user input voice command selecting the interactive display, and a second set of voice input data, wherein the second voice input device is communicatively coupled to a second interactive display and the at least one processor, and wherein the at least one processor is communicatively coupled to the interactive display and the second interactive display;
interpreting, by the at least one processor, the second set of voice input data to produce a second interpreted result;
presenting, by the interactive display, a second text representation of the second interpreted result coupled to the user-controlled cursor;
receiving, by the user interface, a second user input selection of a second graphical element presented by the interactive display; and
performing, by the at least one processor, a second operation associated with the second interpreted result and the second user input selection.

9. A system for user interaction with an interactive display, the system comprising:
a system memory element;
a voice input device, configured to receive a set of voice input data;
an interactive display, configured to present a plurality of graphical elements and a user-controlled cursor;
a user interface, configured to receive a user input manipulation of the user-controlled cursor;
at least one processor, communicatively coupled to the system memory element, the voice input device, the interactive display, and the user interface, the at least one processor configured to:
interpret the set of voice input data to produce an interpreted result;
present, via the interactive display, a combination element comprising a text representation of the interpreted result coupled to the user-controlled cursor, wherein presentation of the combination element provides visual feedback indicating content of the interpreted result, and wherein the combination element is configured for user manipulation including positioning the combination element and making selections using the combination element;
receive, via the user interface, a user input selection of one of the plurality of graphical elements, wherein the user input selection is performed via the user manipulation of the combination element over the textual or graphical element and performance of a click to select the textual or graphical element;
perform an operation associated with the interpreted result and the user input selection, wherein the interpreted result comprises a command, and wherein the command comprises the operation applicable to manipulate the textual or graphical element presented by the interactive display; and
after performing the operation associated with the interpreted result, present the user-controlled cursor without the text representation of the interpreted result, to indicate performance of the operation associated with the interpreted result.

10. The system of claim 9, wherein the at least one processor is further configured to:

receive a user input selection of a data field, wherein the one of the plurality of graphical elements comprises the data field;
wherein performing the operation associated with the interpreted result and the user input selection further comprises:
positioning the text representation coupled to the user-controlled cursor in the data field; and
pasting the text representation in the data field, based on the positioning.

11. The system of claim 9, wherein the at least one processor is further configured to:
receive a user input selection of a data field, wherein the one of the plurality of graphical elements comprises a data field; and
wherein performing the operation associated with the interpreted result and the user input selection further comprises:
identifying a data type associated with the text representation;
positioning the text representation coupled to the user-controlled cursor in the data field; and
when the data type associated with the text representation corresponds to a type associated with the data field, pasting the text representation in the data field, based on the positioning.

12. The system of claim 9, wherein the at least one processor is further configured to:
receive a user input selection of a graphical list comprising a plurality of list items, wherein the one of the plurality of graphical elements comprises the graphical list;
wherein performing the operation associated with the interpreted result and the user input selection further comprises:
performing an automatic selection of one of the list items, based on the interpreted result; and
presenting the one of the list items.

13. The system of claim 9, wherein the at least one processor is further configured to:
receive a user input selection of one of a plurality of displayed features, wherein the one of the plurality of graphical elements comprises the one of the plurality of displayed features; and
identify a command, based on the interpreted result; and
wherein performing the operation associated with the interpreted result and the user input selection further comprises:
executing the command;
altering the one of the plurality of displayed features, based on executing the command, to create an altered plurality of displayed features;
presenting the altered plurality of displayed features, via the interactive display.

14. The system of claim 9, wherein the voice input device comprises a push-to-talk (PTT) voice input device communicatively coupled to the interactive display; and
wherein the at least one processor is further configured to receive a first PTT indication, the set of voice input data, and a second PTT indication, and wherein the first PTT indication and the second PTT indication bound the set of voice input data.

15. The system of claim 9, wherein the voice input device comprises a microphone communicatively coupled to the interactive display; and
wherein the at least one processor is further configured to:
identify a starting point in time and an endpoint in time; and
obtain voice data between the starting point and the endpoint, wherein the set of voice input data comprises the voice data.

16. A non-transitory, computer-readable medium containing instructions thereon, which, when executed by a processor, perform a method comprising:
performing, by the processor, an operation of an interactive display using a set of voice input data and a user-selected graphical element, by:
creating a combination element comprising a text representation of an interpreted result of the set of voice data coupled to a user-controlled cursor;
presenting the combination element to provide visual feedback indicating content of the interpreted result, and wherein the combination element is configured for user manipulation including positioning the combination element and making selections using the combination element;
receiving, by a user interface, a user input selection of the user-selected graphical element presented by the interactive display, wherein the user input selection is performed via the user manipulation of the combination element over the user-selected graphical element and performance of a click to select the user-selected graphical element, and wherein the user interface is communicatively coupled to the at least one processor and the interactive display;
performing, by the processor, the operation associated with the interpreted result and the user input selection, wherein the interpreted result comprises a command, and wherein the command comprises the operation applicable to manipulate the textual or graphical element presented by the interactive display; and
after performing the operation associated with the interpreted result, presenting the user-controlled cursor without the text representation of the interpreted result, to indicate performance of the operation associated with the interpreted result.

17. The non-transitory, computer-readable medium of claim 16, wherein the method further comprises:
receiving the set of voice input data, via a voice input device communicatively coupled to the interactive display and the processor; and
interpreting, by the processor, the set of voice input data to produce an interpreted result;
wherein the operation is performed based on the interpreted result.

18. The non-transitory, computer-readable medium of claim 17, wherein the voice input device comprises at least one of a push-to-talk (PTT) device and a microphone.

19. The non-transitory, computer-readable medium of claim 17, wherein the method further comprises:
presenting, by the interactive display, a text representation of the interpreted result coupled to a user-controlled cursor;
receiving, via a user interface, a user input selection of a graphical element presented by the interactive display, wherein the user interface is communicatively coupled to the processor and the interactive display;
wherein the operation is associated with the interpreted result and the user input selection.

20. The non-transitory, computer-readable medium of claim 19, wherein receiving the user input selection further comprises receiving a user input selection of a data field; and wherein performing the operation associated with the interpreted result and the user input selection further comprises:
- identifying a data type associated with the text representation;
- positioning the text representation coupled to the user-controlled cursor in the data field; and
- when the data type associated with the text representation corresponds to a type associated with the data field, pasting the text representation in the data field, based on the positioning.

* * * * *